UNITED STATES PATENT OFFICE 2,477,842

PREPARATION OF AMINOALCOHOLS

Wilhelm Wenner, Montclair, N. J., assignor to Hoffmann-La Roche Inc., Nutley, N. J., a corporation of New Jersey No Drawing. Application May 25, 1946, Serial No. 672,343

9 Claims. (Cl. 260—247)

My invention relates to the preparation of aminoalcohols of the general formula $$HO.CH_2.C(CH_3)_2.CH_2.R$$

and to salts thereof, R representing a tertiary amino radical. The tertiary amino radical may be, for example a dialkylamino radical, wherein the alkyl groups are the same or different, a heterocyclic radical, such as piperidyl, or morpholyl (morpholinyl), or a radical, such as methylbenzyl-amino, or dibenzylamino. Examples of suitable dialkylamino radicals are dimethylamino, diethylamino, dibutylamino, methylethyl-amino, and the like.

The novel process of my invention involves the catalytic hydrogenation of solutions of salts of aminoaldehydes of the general formula $$O:CH.C(CH_3)_2.CH_2.R$$

wherein R has the significance given above, the hydrogenation being carried out in the presence of a nickel catalyst, such as Raney nickel.

Examples of specific compounds which can be prepared by my novel method are:

(a) β,β-dimethyl-γ-dimethylamino-propanol
(b) β,β-dimethyl-γ-diethylamino-propanol
(c) β,β-dimethyl-γ-dibutylamino-propanol
(d) β,β-dimethyl-γ-methylethylamino-propanol
(e) β,β-dimethyl-γ-dibenzylamino-propanol
(f) β,β-dimethyl-γ-methylbenzylamino-propanol
(g) β,β-dimethyl-γ-(N-piperidyl)-propanol
(h) β,β-dimethyl-γ-(4-morpholyl)-propanol The aminopropanols can be prepared from salts of aminoaldehydes, either using the aminoaldehyde salts in isolated state or in the composition in which they are formed. The preparation of the aldehydes can be carried out by the known Mannich reaction. A typical example of this synthesis is given in Mannich U. S. P. No. 1,824,676. Specific methods of preparation of aminoaldehydes are given as follows:

EXAMPLE A

α,α-Dimethyl-β-dimethylamino-propionaldehyde 170 g. of isobutyraldehyde techn., 160 g. dimethylamine hydrochloride, 100 cc. of abs. alcohol, and 90 g. of paraformaldehyde, are stirred and refluxed for on hour. 90 g. of paraformaldehyde are then added and heating and stirring are continued for another hour. The mixture is then cooled, and the crystals separated by filtration. The crude hydrochloride is dissolved in about 300 cc. of water, and the solution is made alkaline by addition of sodium hydroxide. The aminoaldehyde separates as an oil. It is separated and fractionated in vacuum. Pure α,α-dimethyl - β - dimethylamino - propionaldehyde, which boils 39–43°/10 mm., is obtained.

EXAMPLE B

α,α-Dimethyl-β-di-n-butylamino-propionaldehyde 129 g. di-n-butylamine is added to a cold mixture of 60 g. (95 percent) sulfuric acid and 75 cc. abs. alcohol. To the solution 76 g. of isobutyraldehyde (techn.) and 73 g. of paraformaldehyde are added. The mixture is stirred and refluxed for 4 hours. After cooling, 500 cc. water, 100 g. sodium sulfite and an excess of sodium hydroxide is added. The aminoaldehyde separates as an oil which is fractionated in vacuo. α,α-Dimethyl - β - di-n-butylamino-propionaldehyde is obtained as a colorless oil of B. P. 105–110°/10 mm.

EXAMPLE C

α,α - Dimethyl-β-(N-piperidyl) - propionaldehyde 85 g. of piperidine is added to a cold mixture of 50 g. (95 percent) sulfuric acid and 65 cc. of abs. alcohol. To the solution 76 g. isobutyraldehyde (techn.) and 73 g. paraformaldehyde are added. The mixture is stirred and refluxed for 4 hours. After cooling, a solution of 100 g. sodium sulfite in 600 cc. water is added, and then sodium hydroxide is added until the mixture reacts distinctly alkaline against phenolphthalein. The crude aminoaldehyde separates as a brown oil. Fractionation in vacuo yields the pure α,α-dimethyl-β-(N-piperidyl)-propionaldehyde boiling at 77–80°/10 mm.

EXAMPLE D

α,α-Dimethyl-β-(4-morpholyl) - propionaldehyde 85 g. of morpholine is dissolved in a cold mixture of 60 g. (95 percent) sulfuric acid and 100 cc. abs. alcohol. 76 g. of isobutyraldehyde (techn.) and 73 g. of paraformaldehyde are added and the mixture is stirred and refluxed for 4 hours. After cooling, 100 g. of sodium sulfite in 800 cc. water, and excess sodium hydroxide are added until the mixture reacts alkaline to phenolphthalein. The aminoaldehyde separates as an oil which is fractionated in vacuo. Pure α,α-dimethyl - β - (4-morpholyl)-propionaldehyde of B. P. 92–95°/10 mm. is obtained.

In general, my novel process comprises catalytically hydrogenating a solution of a salt of the aminoaldehyde, in the presence of a nickel catalyst. Various salts may be employed, such as hydrohalides, and more particularly hydrochlorides.

A preferred catalyst is Raney nickel. The pH of the solution of the salt is maintained above pH 4. The temperature of hydrogenation as well as the pressure may be varied. The temperature may be as low as room temperature and as high as 80° C. Preferably a temperature of 50 to 60° is used. The pressure can vary from atmospheric to as high as 1000 p. s. i. or more. The selection of suitable temperatures, pressures, and times will be apparent to persons familiar with hydrogenation technique. For economic reasons, I prefer to carry out the hydrogenation of the salt of the aminoaldehyde in an aqueous solution.

The products of the hydrogenation are the salts of the aminoalcohols corresponding to the aminoaldehydes employed. The salts can be used as such, or they can be treated with alkaline material, such as ammonia, sodium hydroxide, sodium carbonate or the like, to liberate the free base. The free bases are colorless oils which can be distilled without decomposition. The hydrochloride salts of the aminoalcohols are, in general, insoluble in acetone, and can be recrystallized from acetone-water or acetone-alcohol mixtures.

The salt of the aminoaldehyde can be conveniently prepared by dissolving the aminoaldehyde in dilute acid, such as 3n HCl. The solution can be used directly for the hydrogenation step.

The aminoalcohols and their hydrohalide salts are useful as intermediates for the preparation of other organic compounds. They may be employed for the synthesis of esters of the type described in U. S. P. Nos. 1,932,341 and 1,987,546. My novel process is particularly adapted to technical manufacture being characterized by ease of execution and by high yields of aminopropanols.

The significance of my invention will be made apparent by the following illustrative examples which will serve as a guide for those skilled in the art to carry out the reaction. The hydrogenation can be carried out under various conditions of time, temperature, proportions, pressure, and the like. It will be appreciated that supplementary processes, such as purification and the like may be resorted to wherever found desirable or convenient.

EXAMPLE I $\beta,\beta$-Dimethyl-$\gamma$-dimethylamino-propanol 20 g. of $\alpha,\alpha$-dimethyl-$\beta$-dimethylamino-propionaldehyde are dissolved in 60 cc. of 3n HCl. 3 g. of Raney nickel are added and the mixture hydrogenated at 40–50° and 600 lbs. pressure for 3 hours. The solution is filtered and distilled to remove the water. The hydrochloride of $\beta,\beta$-dimethyl-$\gamma$-dimethylamino-propanol crystallizes during the distillation. It is stirred up with acetone and filtered. The free base is liberated by sodium hydroxide from a solution of the hydrochloride in water. Because the free base itself is soluble in water to about 13–15 percent at room temperature it is necessary to work in concentrated solution. From its aqueous solution the free $\beta,\beta$-dimethyl-$\gamma$-dimethylamino-propanol is salted out by saturation with potassium carbonate. The free base has B. P. 34–36°/10 mm.

EXAMPLE II $\beta,\beta$-Dimethyl-$\gamma$-di-n-butylamino-propanol 18.5 g. of $\alpha,\alpha$-dimethyl-$\beta$-di-n-butylamino-propionaldehyde are dissolved in 3n HCl. The pH is adjusted to 5.5 with ammonia. The solution is hydrogenated with 3 g. Raney nickel at 60–70° and 500 lbs. pressure for 2 hours. It is then filtered. Addition of sodium hydroxide liberates the free base. It is purified by vacuum distillation. Pure $\beta,\beta$-dimethyl-$\gamma$-di-n-butylamino-propanol of B. P.$_{10}$ 113–117° is obtained.

EXAMPLE III $\beta,\beta$-Dimethyl-$\gamma$-(N-piperidyl)-propanol 34 g. of $\alpha,\alpha$-dimethyl-$\beta$-(N-piperidyl)-propionaldehyde are dissolved in dilute hydrochloric acid and the pH is adjusted to 6 by means of sodium carbonate. The solution is hydrogenated at 60° and 400 lbs. pressure with 2 g. Raney nickel. The solution is filtered and distilled to remove the water. The residue crystallizes. It is filtered and washed with acetone. The hydrochloride has M. P. 200–203°. Addition of sodium hydroxide liberates the free $\beta,\beta$-dimethyl-$\gamma$-(N-piperidyl)-propanol. It distills at 93–94°/10 mm.

EXAMPLE IV $\beta,\beta$-Dimethyl-$\gamma$-(4-morpholyl)-propanol 21 g. of $\alpha,\alpha$-dimethyl-$\beta$-(4-morpholyl)-propionaldehyde are dissolved in dilute hydrochloric acid. The pH is adjusted to 6 with ammonia, and the volume brought to 80 cc. with water. 3 g. of Raney nickel are added. Hydrogenation is carried out for 4 hours at 50–60° at 500 lbs. pressure. The solution is filtered and distilled to remove the water. The residue which is the hydrochloride of $\beta,\beta$-dimethyl-$\gamma$-(4-morpholyl)-propanol crystallizes. It is recrystallized from alcohol. M. P. 146–148°. The free base can be liberated as shown in preceding examples.

EXAMPLE V $\beta,\beta$-Dimethyl-$\gamma$-diethylamino-propanol

A solution of 10 percent hydrochloric acid is added slowly to 100 g. of $\alpha,\alpha$-dimethyl-$\beta$-diethylamino propionaldehyde, while cooling with ice water, until the solution has a pH of 5–6. About 230 cc. of acid are required. The solution is then filtered through paper and diluted to 500 cc. The solution and 5 g. of Raney nickel catalyst are introduced into a nickel hydrogenation autoclave. The hydrogen pressure is brought to 150 pounds, and the autoclave is maintained at 60° C., the hydrogenation taking four hours. After cooling to room temperature, the solution is filtered to remove the catalyst. The product is a solution of the hydrochloride salt of $\beta,\beta$-dimethyl-$\gamma$-diethylamino-propanol. The solution is treated with aqueous ammonia to effect the liberation of the free base as an oil. The product is $\beta,\beta$-dimethyl-$\gamma$-diethylamino-propanol, boiling at 84–88°/10 mm.

I claim:

1. A process of preparing aminoalcohols of the general formula

and hydrochloride salts thereof, which comprises hydrogenating, in the presence of a nickel catalyst, and in an aqueous solvent medium a hydrohalide salt of an aldehyde of the general formula

R being the same in both formulae and representing a tertiary aliphatic amino radical, R being joined to the molecule through a carbon to nitrogen bonding.

2. A process conforming to claim 1, in which the catalyst is Raney nickel.

3. A process conforming to claim 1, in which a hydrochloride salt of the aminoaldehyde is employed.

4. A process conforming to claim 1, in which R represents dialkylamino.

5. A process conforming to claim 1, in which R represents diethylamino.

6. A process conforming to claim 1, in which R represents N-piperidyl.

7. A process conforming to claim 1, in which R represents 4-morpholyl.

8. A process which comprises hydrogenating, in an aqueous medium and in the presence of a nickel catalyst, a hydrochloride of $\alpha,\alpha$-dimethyl-$\beta$-diethyl-amino-propionaldehyde.

9. A process conforming to claim 1 in which the pH of the solution of the salt is maintained above pH 4 during the hydrogenation.

WILHELM WENNER.

REFERENCES CITED

The following references are of record in the file of this patent:

UNITED STATES PATENTS

| Number | Name | Date |
|---|---|---|
| 1,824,676 | Mannich | Sept. 22, 1941 |

OTHER REFERENCES

Mannich et al., "Ber. Deut. Chem.," vol. 55, pages 3510–3526 (1922).

Catalysis in Organic Chemistry, Sabatier-Reid, second edition (1923), pages 432–33. (Copy in Division 59.)

Adams et al., "Organic Reactions" (John Wiley, 1942), vol. 1. (Available Pat. Office Library.)

J. A. C. S.—65 (1943), pages 1967–1970. (Copy in Patent Office Scientific Library.)